Jan. 15, 1924.
J. H. MacMAHON
LIQUID BLEACH APPARATUS
Original Filed Sept. 20, 1922
1,481,107
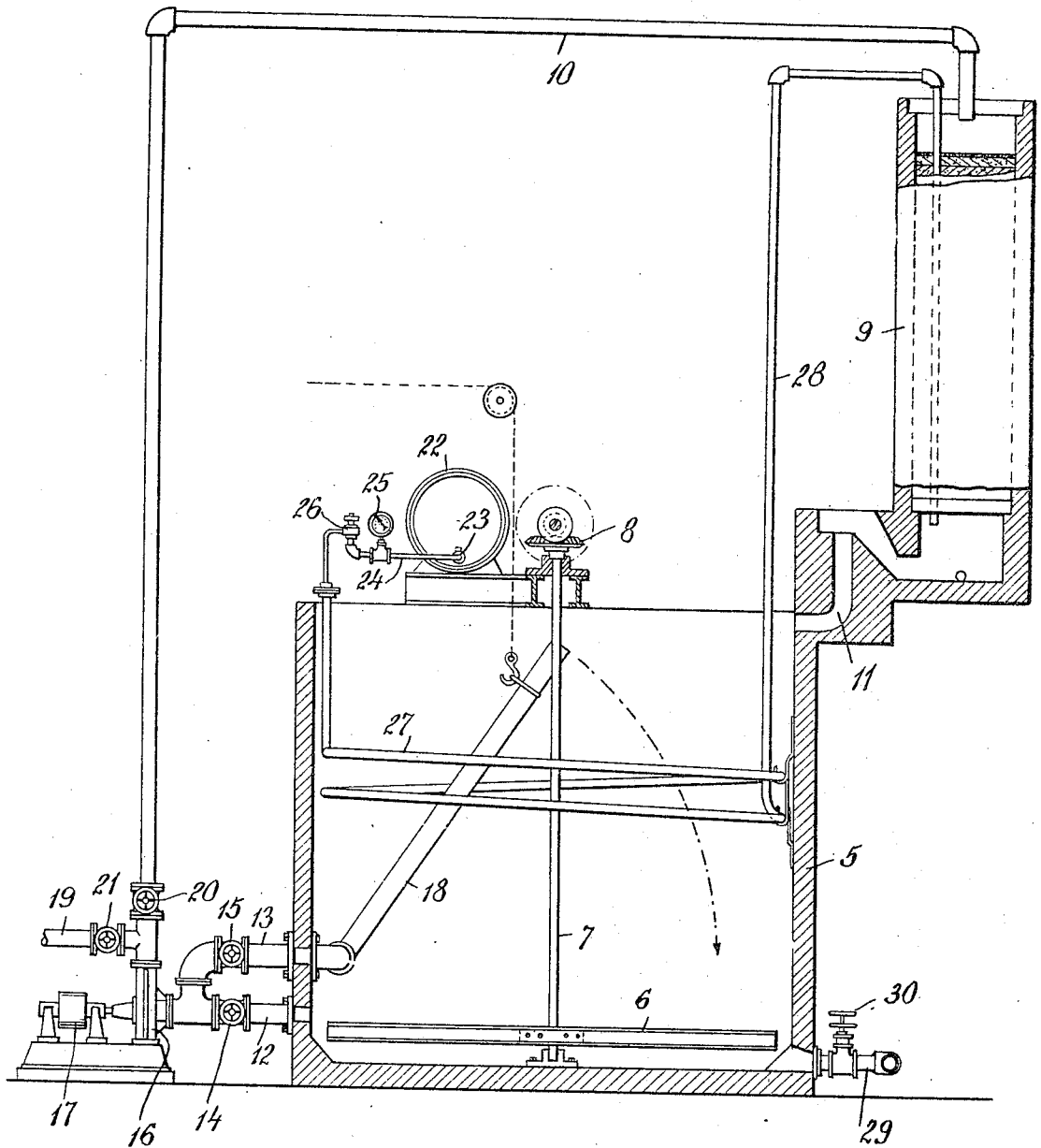

Patented Jan. 15, 1924.

1,481,107

UNITED STATES PATENT OFFICE.

JAMES H. MacMAHON, OF NIAGARA FALLS, NEW YORK, ASSIGNOR TO MATHIESON ALKALI WORKS, INC., OF NEW YORK, N. Y., A CORPORATION OF VIRGINIA.

LIQUID-BLEACH APPARATUS.

Original application filed September 20, 1922, Serial No. 589,328. Divided and this application filed September 21, 1923. Serial No. 664,031.

*To all whom it may concern:*

Be it known that I, JAMES H. MACMAHON, a citizen of the United States, residing at Niagara Falls, in the county of Niagara, State of New York, have invented certain new and useful Improvements in Liquid-Bleach Apparatus; and I do hereby declare the following to be a full, clear, and exact description of the invention, such as will enable others skilled in the art to which it appertains to make and use the same.

This invention relates to an improved apparatus intended particularly for the preparation of liquid bleach solutions and the like requiring combination of a gaseous reagent with other reagents in solution or suspension.

The manufacture of liquid bleach solutions by passing chlorine gas into milk of lime, caustic soda solutions or similar alkalies has long been known. It is customary, for example, in preparing these solutions on a small scale to simply pass the gas into the alkali solution until the reaction has been carried to the desired extent. In making such solutions, however, the temperature should not rise above approximately 40° C. since the solutions are unstable and their rate of decomposition increases very rapidly at temperatures above that noted. For this reason it is customary to make only dilute solutions starting with a cold alkaline solution, or when more concentrated solutions are made, artificial refrigeration is employed to maintain the temperature below the critical point. This refrigeration has been accomplished, for example, by the addition of ice or by cooling with brine coils.

Another difficulty experienced in the preparation of liquid bleach solutions results from the inability of the operator to accurately control the end point. It is usual to prepare such solutions in absorption towers where milk of lime, for example, is subjected to the action of chlorine gas which is introduced at the base of the tower. The solution flows from the tower to a tank and is thence returned to the tower by means or a pump. The only practicable means for determining when the solution is finished is by titrating the liquor for its chlorine content, and inasmuch as the chlorine is continuously entering the tower the operator is usually unable to satisfactorily determine the point at which the introduction of chlorine should be stopped. More frequently than otherwise the liquor will contain more or less chlorine than is desirable and the introduction of excess chlorine usually results in the rapid decomposition of the liquor and interferes with the settling of sludge therefrom.

It is one of the objects of the present invention to provide an apparatus whereby solutions of relatively high concentration may be produced without danger of objectionable overheating of the solution.

In the improved apparatus of the invention, liquid chlorine is employed, and is brought, while still in a liquid state, directly into, or into heat-interchanging relation with, the alkaline solution with which it is to be combined to form the bleach solutions, and advantage is thus taken of the considerable latent heat of vaporization of the liquid chlorine to cool the alkaline solution. Thus the necessity for refrigeration by providing brine coils or other cooling or refrigerating means is avoided.

In the operation of the apparatus, the reaction between the chlorine and the alkaline solution is advantageously conducted with predetermined quantities of the reagents, i. e., by passing a definite weight of chlorine into a definite volume of milk of lime or other alkaline solution containing sufficient lime or other alkali to combine with the chlorine and produce a bleach solution of the desired strength. Thus, if the volume of alkaline solution is the same for each successive batch and the weight of chlorine is also the same, a liquor of uniform strength will always be produced and the amount of alkali can be so finely adjusted to the chlorine that liquors of alkaline or neutral characteristics can be produced readily and overchlorination can be entirely avoided.

Various methods of procedure can be followed in using the apparatus of the invention. The liquid chlorine can be supplied from the usual form of container but the container should be so arranged as to permit the withdrawal of the chlorine in the liquid state instead of in a gaseous state, thus avoiding vaporization of the chlorine in the container and the consequent lowering of the temperature. By avoiding this lowering of temperature in the chlorine container, the necessity for heating the container is likewise avoided. When the chlorine is supplied in large containers holding, for example, one ton or more of liquid chlorine, utilization of the liquid chlorine directly according to the present invention eliminates the necessity for the provision of a heating and vaporizing container intermediate the large chlorine container and the alkaline solution to heat the liquid chlorine and supply its heat of vaporization. The present invention accordingly results in a marked simplification in the handling of liquid chlorine for the purposes herein described.

The conducting of the liquid chlorine into, or into heat-interchanging relation with, the alkaline solution can be carried out in various ways. The liquid chlorine is advantageously introduced through a metal pipe coil, preferably of lead, placed in the bottom of the tank containing the alkaline solution, and connected with a nozzle or other means for discharging the resulting vaporized chlorine into the alkaline solution. The chlorine is advantageously introduced into a tower or chamber into which the alkaline solution is sprayed or showered, or which is filled with the alkaline solution and into which the chlorine is introduced near the lower portion. By introducing the alkaline solution in the form of a spray or shower, the tower can be provided with an atmosphere of chlorine, and the alkaline solution can be cooled before its introduction by the vaporization of the liquid chlorine. The absorption tower can be provided with obstructions or baffles to retard the flow of liquid and to expose a maximum surface of the alkaline solution to the chlorine gas. Instead of introducing the liquid chlorine directly into the tower or apparatus into which the alkaline solution is introduced, the chlorine may first be passed through a pipe coil submerged in the alkaline solution to accomplish the vaporization or partial vaporization of the liquid chlorine and the simultaneous cooling of the solution. This cooling may be accomplished at the base of the tower through which the alkaline solution flows or in a separate tank in which the solution is collected and from which it is returned to the tower for further absorption. The chlorine vaporized in the coil may be introduced therefrom into the tower where it contacts with the solution and accomplishes the desired reaction. As noted, the solution into which the chlorine is introduced may be the same body which is utilized for heating the liquid chlorine and bringing about its vaporization, or the body of alkaline solution can be circulated and brought into contact at one location with the chlorine gas and at another location into heat-interchanging relation with the liquid chlorine.

The present application is a division of my prior application Serial No. 589,328 filed September 20, 1922, and the apparatus of the present application is particularly intended and adapted for the carrying out of the process of said application.

The invention will be further illustrated by the accompanying drawing, which is somewhat conventional and diagrammatic in character and which illustrates one embodiment of the apparatus of the invention.

Referring to the drawing, 5 indicates a tank provided with an agitating device 6 which may be mounted, for example, on a suitable shaft 7 and driven through bevel gearing 8 or other suitable driving connections from a source of power. A tower 9 is supported above the level of the tank and is adapted to be filled with suitable material to retard the flow of solution therethrough and thus expose a maximum surface to the gas. A pipe 10 is provided to deliver the solution to the tower and an outlet 11 from the tower permits return thereof to the tank. Outlets 12 and 13 controlled by valves 14 and 15 permit the withdrawal of liquid therefrom to the intake-side of a pump 16 which may be driven through a pulley 17 or other suitable driving connection from a source of power. A movable pipe 18 connected to the outlet 13 is adapted to be raised and lowered to permit decantation of the liquor in the tank. The outlet side of the pump is connected to the pipe 10 and to a discharge pipe 19, the pipes being controlled by valves 20 and 21 to permit circulation of the liquor or discharge thereof when finished.

A chlorine tank 22 is supported above the tank 5 and is provided with an outlet valve 23 through which the liquid chlorine is delivered to a pipe 24. A pressure gauge 25 and pressure-reducing valve 26 are connected to the pipe 24 which delivers the liquid chlorine to a coil 27 disposed in the tank 5 and adapted to convey the liquid chlorine in heat-interchange with the liquor whereby the chlorine is vaporized and the liquor is cooled. From the coil the gaseous chlorine is delivered through a pipe 28 to the tower 9 near the bottom thereof so that the gas passes upwardly through the tower and is absorbed by the liquor descending therein.

As an example of the operation of the apparatus the tank 5 may have a total capacity of 9200 gallons with an available capacity under practical conditions of 8000 gallons. It is designed to hold a sufficient quantity of milk of lime to absorb the contents of a container holding 2000 pounds of liquid chlorine to produce a bleach liquor with a chlorine content of 30 grams per liter corresponding to a strength of 7½° Bé., which is that most generally used in paper and pulp mills.

In operating the apparatus, the tank 5 is first filled with water to the required level and the circulating pump and agitator are started. Lime is then added, either in the form of quick lime or hydrated lime. If quick lime is used, one pound is required per pound of liquid chlorine. One and one-quarter pounds of hydrated lime per pound of liquid chlorine are required if hydrated lime is used in place of quick lime. In order to produce a liquor of uniform quality as hereinbefore described, the liquid chlorine container 22 should be capable of holding 2000 pounds of liquid chlorine. The chlorine is vaporized in the coil 27 and the gas passed to the tower where it is rapidly absorbed by the milk of lime, it being understood that the circulating pump 16 is in operation to deliver the liquor from the tank to the tower. The circulation of liquor by the pump is continued until all of the chlorine is absorbed, this being indicated by the pressure gauge 25. When the gauge registers 0 all of the chlorine will have been discharged and the container may be disconnected. The finished material is allowed to settle in the tank 5 and the liquor is decanted through the pipe 18 and delivered to the stock tanks. The small amount of sludge remaining after the preparation of each batch is allowed to accumulate until there is a sufficient quantity to warrant washing, when it is agitated with additional quantities of water. Clear wash water is separated from the sludge for use as "make-up" liquor for a fresh batch and the waste sludge is withdrawn through a waste pipe 29 controlled by a valve 30.

It will be understood that the apparatus of the present invention makes use in a particularly advantageous way of the latent heat of vaporization of liquid chlorine to counteract the heat of solution of the chlorine and the heat of reaction between the chlorine and the alkali in the solution while the heat of the original solution, together with the heat of reaction, are utilized to vaporize the liquid chlorine. The neutralization of the heat effects in this way is such that, for example, a hypochlorite solution can be made up with milk of lime and chlorine so as to contain as much as 100 grams or more of available chlorine per liter, and starting with milk of lime at an initial temperature of 20° C. the final temperature will not exceed 30° C. It will be evident that solutions of lower chlorine content may similarly be produced either directly by chlorination of the alkaline solution or indirectly by dilution of the stronger bleach solution produced, for example, with a chlorine content such as that described.

The apparatus of the invention is applicable not only to the production of bleach solutions by chlorinating milk of lime but also for the production of bleach solutions by chlorinating solutions of caustic soda or of other alkalies where heat of reaction is similarly developed by the chlorination and where the latent heat of vaporization of the chlorine can be utilized similarly in cooling the alkaline solution during or after the reaction.

The improved apparatus of the invention greatly simplifies the utilization of liquid chlorine and eliminates the need for a special separate evaporator with special heating means for heating and vaporizing the chlorine. This separate heating of a considerable quantity of liquid chlorine, which has been heretofore practised, and which the apparatus of the present invention obviates, is attended with some danger; for example, in case the chlorine gas outlet becomes accidentally closed or where the temperature rises rapidly with resulting production of excessive pressures. With the apparatus of the present invention the chlorine can never be heated above the temperature of the liquid with which it is brought into heat-interchanging relation and into which it is introduced so that overheating of the chlorine is avoided.

Various changes can be made in the details of the apparatus described herein without departing from the invention.

I claim:

1. An apparatus for vaporizing liquefied gas and for absorbing the vaporized gas in a liquid, comprising a container for the liquid, a source of liquefied gas, means for passing the liquefied gas in heat-interchanging relation with the liquid in said container to vaporize the gas, a tower, means for introducing the vaporized gas into the tower, and means for circulating the liquid from the container to the tower.

2. An apparatus for vaporizing liquefied gas and for absorbing the vaporized gas in a liquid, comprising an absorption tower for absorbing the gas in the liquid, means for introducing the gas into said tower, means for introducing the liquid into said tower, and heat interchanging means for passing the liquefied gas in indirect contact with the liquid to effect vaporization of the liquefied gas before its introduction into the absorption tower.

3. An apparatus for vaporizing liquefied gas and for absorbing the vaporized gas in a liquid, comprising an absorption tower for absorbing the gas in the liquid, means for introducing the gas into said tower, a container or receptacle for holding a body of the liquid, means for circulating the liquid from said container to the absorption tower and back to the container and means for passing the liquefied gas in heat interchanging relation with the liquid in the container to effect its vaporization before introducing it into the tower.

4. An apparatus for vaporizing liquefied gas and for absorbing the vaporized gas in a liquid, comprising an absorption tower for absorbing the gas in the liquid, means for introducing the gas into said tower, a container arranged to permit flow by gravity of the liquid from the tower thereinto, means for circulating the liquid from said container to the top of the tower, and means for circulating the liquefied gas in indirect and heat interchanging relation with the liquid in said container before introducing it into the tower.

5. An apparatus for vaporizing liquid chlorine and for absorbing the chlorine in milk of lime for the production of a liquid bleach solution, comprising a tank or receptacle for the milk of lime, an agitator in the tank, a source of liquefied chlorine, an absorption tower, a coil in the tank connected with the liquid chlorine supply and with the tower and means for circulating the milk of lime between the tank and tower.

6. An apparatus for vaporizing liquid chlorine and for absorbing the chlorine in milk of lime for the production of a liquid bleach solution, comprising a container for the milk of lime, an agitator in the container, a source of liquefied chlorine, means for passing the liquefied chlorine in heat interchanging relation with the milk of lime in said container, an absorption tower, means for introducing the chlorine into the tower after its passage through the heat interchanger, and means for circulating the milk of lime from the container to the tower.

In testimony whereof I affix my signature.

JAMES H. MacMAHON.